(12) United States Patent
Faulkner et al.

(10) Patent No.: US 6,399,882 B1
(45) Date of Patent: Jun. 4, 2002

(54) DUAL-HINGED DOOR FOR AN ELECTRICAL POWER DISTRIBUTION BUSWAY

(75) Inventors: Nathan H. Faulkner, Pauline, SC (US); John J. Brockhaus, Cincinnati, OH (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 09/165,696

(22) Filed: Oct. 2, 1998

(51) Int. Cl.⁷ ................................................ H02G 5/00
(52) U.S. Cl. ................. 174/99 B; 174/68.2; 174/71 B; 174/72 B; 174/101; 439/114; 439/212
(58) Field of Search ............................... 174/99 B, 68.1, 174/68.2, 72 C, 72 B, 71 B, 97, 98, 99 R, 101, 135; 439/114, 212, 213; 16/231

(56) References Cited

U.S. PATENT DOCUMENTS

| | | |
|---|---|---|
| 418,255 A | 12/1889 | Welter |
| 1,574,993 A | 3/1926 | Miner |
| 2,059,988 A | 11/1936 | Frank ............................. 247/3 |
| 2,733,289 A | 1/1956 | Warren et al. ................. 174/99 |
| 3,018,320 A | 1/1962 | Rowe ........................... 174/99 |
| 3,072,736 A | 1/1963 | Wallace ........................ 174/99 |
| 3,088,994 A | 5/1963 | Cataldo ......................... 174/99 |
| 3,113,820 A | 12/1963 | Norden ......................... 339/22 |
| 3,209,301 A | 9/1965 | Duffy, Jr. ...................... 339/22 |
| 3,345,455 A | 10/1967 | Goody ......................... 174/112 |
| 3,384,855 A | 5/1968 | Jorgensen et al. ............. 339/22 |
| 3,402,254 A | 9/1968 | Parker et al. ................. 174/133 |
| 3,566,331 A | 2/1971 | Stanback et al. ............. 339/22 |
| 3,584,138 A | 6/1971 | Pritzen, Jr. ................... 174/68 |
| 3,710,300 A | 1/1973 | Koenig et al. ................ 339/22 |
| 3,726,988 A | 4/1973 | Davis .......................... 174/68 |
| 3,777,084 A | 12/1973 | Rys ........................... 200/50 A |
| 3,818,417 A | 6/1974 | Koenig et al. ................ 339/22 |
| 3,852,515 A | 12/1974 | Jorgensen et al. ............. 174/68 |

(List continued on next page.)

FOREIGN PATENT DOCUMENTS

| | | | |
|---|---|---|---|
| DE | 3111595 A1 | 10/1982 | ............ E05D/7/02 |
| DE | 257 567 A1 | 9/1985 | |
| DE | 19702233 A1 | 7/1998 | ............ H02B/1/20 |
| EP | 0845 563 A1 | 6/1998 | ............ E05B/5/00 |
| FR | 2 719 736 | 11/1995 | ............ H05K/5/02 |

OTHER PUBLICATIONS

Square D Corporation, Busway Systems Catalog, Oct., 1992, Complete Catalog, particularly pp. 4–6, 9.
International Search Report, date of publication, Apr. 13, 2000; Application No. PCT/US99/23032; International Publication No. WO 00/21173.

*Primary Examiner*—Dean A. Reichard
*Assistant Examiner*—W. David Walkenhorst

(57) ABSTRACT

A busway and a door assembly for use with the busway are described. The door assembly provides access to the conductive busbars through openings in the busway housing. The door assembly includes an insulator plate having openings therethrough for access to the busbars. The insulator plate includes two hinge grooves disposed on opposite edges of the insulator plate. Additionally, the door assembly includes a dual-hinged door which includes a pair of hinge rods adapted for engagement with the hinge grooves. By pivotally rotating on the first hinge rod within the first hinge groove, the door may be opened to a first position. Conversely, by pivotally rotating on the second hinge rod within the second hinge groove, the door may be opened in a second direction. Once in either open position, the door cannot be removed from the insulator plate. Additionally, insulator stabs extend from the insulator plate and are disposed between the busbars to prevent arcing between the exposed areas of the busbars.

1 Claim, 9 Drawing Sheets

U.S. PATENT DOCUMENTS

| | | | |
|---|---|---|---|
| 3,922,053 A | * 11/1975 | Hafer | 439/114 |
| 4,146,285 A | 3/1979 | Cook | 339/22 |
| 4,466,541 A | 8/1984 | Tabler et al. | 206/506 |
| 4,612,424 A | 9/1986 | Clark et al. | 200/50 A |
| 4,656,322 A | 4/1987 | Paton et al. | 200/50 A |
| 4,678,253 A | 7/1987 | Hicks, Jr. et al. | 439/210 |
| 4,714,431 A | * 12/1987 | McGoldrick et al. | 439/212 |
| 4,758,536 A | 7/1988 | Miller et al. | 439/138 |
| 4,820,178 A | 4/1989 | Anderson et al. | 439/212 |
| 4,835,350 A | 5/1989 | Ozu et al. | 200/50 A |
| 4,967,924 A | 11/1990 | Murofushi et al. | 220/3.8 |
| 5,067,625 A | 11/1991 | Numata | 220/343 |
| 5,144,720 A | 9/1992 | Aihara et al. | 16/232 |
| 5,173,992 A | 12/1992 | Aihara et al. | 16/232 |
| 5,210,906 A | 5/1993 | Aihara et al. | 16/232 |
| 5,311,824 A | 5/1994 | Sauer et al. | 105/377 |
| 5,415,557 A | * 5/1995 | Chapman et al. | 439/142 |
| 5,442,135 A | 8/1995 | Faulkner | 174/68.2 |
| 5,466,889 A | 11/1995 | Faulkner et al. | 174/68.2 |
| 5,486,651 A | 1/1996 | Morgan | 174/68.2 |
| 5,529,205 A | 6/1996 | Corney et al. | 220/342 |
| 5,530,992 A | 7/1996 | Baermann | 16/231 |
| 5,619,014 A | 4/1997 | Faulkner et al. | 174/68.2 |
| 5,638,838 A | 6/1997 | Lombardi | 132/294 |
| 5,647,652 A | 7/1997 | Zalewski et al. | 312/324 |
| 5,670,743 A | 9/1997 | Welch et al. | 174/49 |
| 5,760,339 A | 6/1998 | Faulkner et al. | 174/88 |
| 5,854,445 A | 12/1998 | Graham et al. | 174/99 B |

* cited by examiner

FIG. 5A

| BUSBAR WIDTH | BUSBAR THICKNESS: EDGE SECTIONS | BUSBAR THICKNESS: CENTER SECTION | BUSWAY WIDTH | CURRENT CAPACITY (AMPERES) |
|---|---|---|---|---|
| 0.75 | 0.094 | 0.094 | 2.00 | 100 |
| 0.75 | 0.094 | 0.094 | 2.00 | 160 |
| 0.75 | 0.094 | 0.094 | 2.00 | 225 |
| 0.75 | 0.094 | 0.094 | 2.00 | 250 |
| 1.50 | 0.094 | 0.094 | 2.75 | 315 |
| 1.50 | 0.094 | 0.094 | 2.75 | 400 |
| 2.80 | 0.094 | 0.094 | 4.05 | 500 |
| 2.80 | 0.094 | 0.094 | 4.05 | 600 |
| 2.80 | 0.094 | 0.094 | 4.05 | 630 |
| 4.25 | 0.094 | 0.125 | 5.50 | 800 |

FIG. 5B

| BUSBAR WIDTH | BUSBAR THICKNESS: EDGE SECTIONS | BUSBAR THICKNESS: CENTER SECTION | BUSWAY WIDTH | CURRENT CAPACITY (AMPERES) |
|---|---|---|---|---|
| 0.75 | 0.094 | 0.094 | 2.00 | 100 |
| 0.75 | 0.094 | 0.094 | 2.00 | 160 |
| 0.75 | 0.094 | 0.094 | 2.00 | 225 |
| 1.10 | 0.094 | 0.094 | 2.35 | 250 |
| 2.80 | 0.094 | 0.094 | 4.05 | 315 |
| 2.80 | 0.094 | 0.094 | 4.05 | 400 |
| 4.25 | 0.094 | 0.125 | 5.50 | 600 |
| 4.25 | 0.094 | 0.125 | 5.50 | 630 |

DUAL-HINGED DOOR FOR AN ELECTRICAL POWER DISTRIBUTION BUSWAY

FIELD OF THE INVENTION

The present invention relates generally to improvements in electrical power distribution busways. More specifically, the present invention relates to an advantageous dual-hinged door for an electrical power distribution busway housing.

BACKGROUND OF THE INVENTION

Electrical power distribution, or busway systems are used to distribute electrical power throughout buildings, particularly commercial or industrial type buildings. Generally, a busway includes a number of busway sections which are connected to one another by busway joints. Each busway section includes a housing that encloses a plurality of busbars which may be phase busbars, neutral busbars, or ground busbars depending on the particular application. High-amp busways, generally utilizing larger busbars, are employed for applications requiring current capacity of 600 amperes or higher. For applications requiring less current, typically 100 to 800 amperes, low-amp busways are employed. Due to the lower current capacity requirements, low-amp busbars are generally smaller and do not maintain the same spacing as the high-amp busbars.

Machines, lights, tools and other components requiring electricity are provided access to the power conducting busbars at various power tap-off locations disposed along the busway. An opening is typically provided through the housing at each power tap-off location and the conductive material of the busbars is exposed for connection with an appropriate plug connector, or bus plug.

A bus plug generally includes an electrical box containing one or more breakers and a disconnect switch. A mechanical connector is provided for mechanically attaching the bus plug to the busway. An electrical connector extends from the bus plug through a window in the busway housing. The connector includes several flat "stab" conductors, or fingers, that make contact with the busbars within the busway.

Access to the busbars within the busway is provided by a door assembly which covers a plurality of slots in the busway housing. In order to provide convenient access in a variety of environments, door assemblies are generally manufactured to open to the left or the right. Depending on the application, either a left-hinged door or a right-hinged door is installed. A main disadvantage of a single-hinged door is that the door may not be able to be opened in the desired direction if an obstruction, such as a wall or T-section of busway, blocks the door. Moreover, manufacturing and storing two different types of door assemblies increases costs to both manufacturers and purchasers. Accordingly, it would be advantageous if a single door assembly could be opened either to the left or the right. Additionally, it would be advantageous if, once opened, the door could not be removed.

SUMMARY OF THE INVENTION

The present invention provides for a dual-hinged door for an electrical distribution busway. One aspect of such a dual-hinged door is that it can be opened to the left or the right, allowing access to the busbars in a variety of operating environments. Additionally, once open, the door cannot be removed from the hinges. The present invention advantageously employs insulator stabs which extend from the insulator plate and are disposed between the busbars to prevent arcing between the exposed areas of the busbars. A gasket allows the present invention to be sealed against moisture.

A more complete understanding of the present invention, as well as further features and advantages, will be apparent from the following Detailed Description and the accompanying drawings.

BRIEF DESCRIPTION OF THE DRAWINGS

FIG. 5A is a table which lists the busway widths, busbar widths, busbar thicknesses and maximum current capacity for copper composition busbars for a first alternative embodiment of a busway in accordance with the present invention;

FIG. 5B is a table which lists the busway widths, busbar widths, busbar thicknesses and maximum current capacity for aluminum composition busbars for a second alternative embodiment of a busway in accordance with the present invention;

DETAILED DESCRIPTION

The present invention provides for a dual-hinged door for an electrical power busway distribution system. The present invention now will be described more fully with reference to the accompanying drawings, in which several presently preferred embodiments of the invention are shown. This invention may, however, be embodied in various forms and should not be construed as limited to the embodiments set forth herein. Rather, applicants provide these embodiments so that this disclosure will be thorough and complete, and will fully convey the scope of the invention to those skilled in the art.

Figure 1:
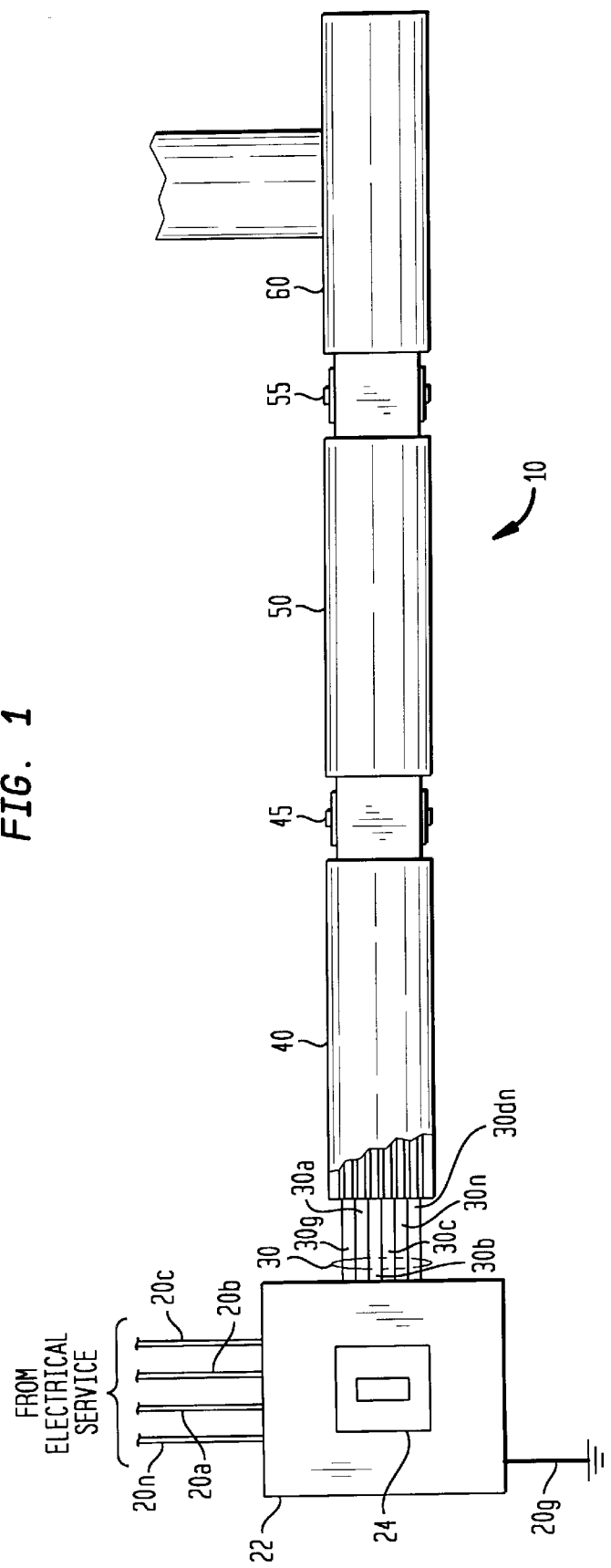
FIG. 1 is a schematic view of an electrical power distribution busway system in accordance with the present invention.

FIG. 1 is a schematic drawing of an electrical power distribution system 10 in accordance with the present invention. Conductors 20a, 20b, 20c, 20n and 20g deliver three-phase power from a source (not shown) to a load center 22 which includes a protective device 24, such as a circuit breaker. A first busway section 40 includes a plurality of conductive busbars 30 (30a, 30b, 30c, 30n, 30dn and 30g) coupled to the protective device 24. The busbars 30 are shown extending from a partially cut away portion of busway section 40 for purposes of illustration, but normally the busbars are enclosed. Various combinations of busbars 30 comprising phase busbars 30a, 30b, 30c (phases A, B and C), ground busbars 30g, and neutral busbars 30n, 30dn may be used, depending on the application.

In the embodiment of FIG. 1, busbar 30a is the A-phase busbar, busbar 30b is the B-phase busbar, busbar 30c is the C-phase busbar, busbar 30n is the neutral busbar, and the busbar 30dn is a second neutral busbar which is optional, depending on the application. Busbars 30a, 30b, 30c, 30n and 30dn may be composed of aluminum, copper or other conductive materials as desired. Busbar 30g, the ground busbar, is preferably limited to copper composition. In the presently preferred embodiment, for copper composition busbars, each of the busbars 30a, 30b, 30c, 30n, and 30dn is configured to carry 225 to 800 amperes of current at potentials ranging from 100 to 690 volts. Similarly, for aluminum composition busbars, each of the busbars 30a, 30b, 30c, 30n and 30dn is configured to carry 225 to 600 amperes of current at potentials ranging from 100 to 690 volts. The busbar must be of sufficient cross-sectional area to carry these currents at these potentials without developing a heating problem.

Referring to FIG. 1, a second busway section 50 is connected to first busway section 40 by a busway joint stack 45. A third busway section 60 is a T-section for routing current in two directions and is connected to the second busway section 50 by another busway joint stack 55. By way of further modification, it will be recognized that the configuration of busway sections 40, 50 and 60 may be modified for use with single phase power.

The embodiment of the busway system shown in FIG. 1 may be employed to conduct electrical power to a variety of locations, in a manufacturing plant, for example. The busway sections can be affixed along a floor, ceiling or wall and may be easily extended to a required length by attaching additional busway sections with additional busway joint stacks. The busway system may also incorporate additional T-sections or other split sections to direct electrical power in varying directions.

Figure 2:
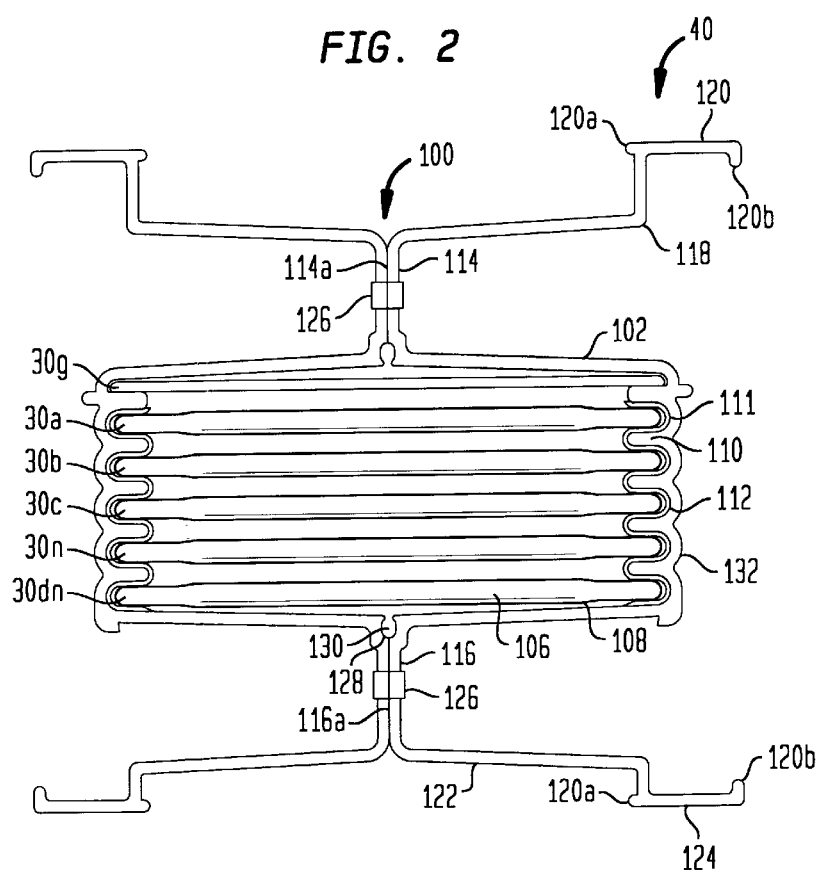
FIG. 2 is an end view of a busway illustrating a plurality of busbars contained within a two-piece housing in accordance with the present invention.

Referring now to FIG. 2, a transverse cross-sectional view of a busway 40 in accordance with the present invention is illustrated. Busbars 30g, 30a–c, 30n and 30dn are horizontally contained within a busway housing 100 in a spaced-apart relationship. A pair of vertical side channels 102 are joined to form the busway housing 100. In the preferred embodiment, side channels 102 are composed of aluminum and formed by an extrusion process, although it will be recognized that other processes may be employed. Each busbar 30, of width 4.25 inches in the embodiment shown in FIG. 2, is composed of a conductive bar 106, typically made from copper, aluminum or other conductive material, and is coated with an insulating layer 108 to prevent arcing between the busbars 30. In the preferred embodiment, the insulating layer 108 is an epoxy insulation applied via an electrostatic spray process. The insulating layer 108 may, however, be an epoxy applied using a fluidized bed process, or the busbars 30 can be wrapped in variety of appropriate thermoset or thermoplastic insulative materials. Use of the insulating layer 108 allows decreased spacing between the busbars 30, lowering the interphase reactance and impedance. The decreased spacing results in a higher cancellation of the magnetic fields around each conductor, yielding lower short circuit forces which in turn result in higher short circuit ratings.

Busbar 30g, which is optional, is coated with the insulative layer 108 only when an isolated ground is implemented to provide a noise free ground. For example, if a busway is supplying power to both industrial machinery whose power consumption varies widely and computer equipment, which requires a minimum variance in power supply, it would be advantageous to connect the computer equipment to a cleaner isolated ground. Conversely, a common ground implementation utilizes busbar 30g without the insulative layer 108, or eliminates busbar 30g altogether and utilizes the housing only as the primary ground path.

Side channels 102 include a series of corrugations 110 which space the busbars 30 apart. Each corrugation 110 functions in a dual role, providing support for the busbar 30 disposed directly above and containment for the busbar 30 directly below. Between adjacent corrugations, the side channel 102 forms a single, continuous radius that creates a semicircular chamber 111 for receiving the end of the busbar 30. The side channel 102 has a corresponding radius, or rib 132, on its outer surface forming with the corrugations a profile having roughly constant wall thickness. The exterior ribs 132 provide additional surface area for heat dissipation.

A plastic, S-shaped polychannel 112 separates the busbars 30 from the side channels 102, providing a barrier between the busbars 30 and side channel corrugations 110. While in the presently preferred embodiment the S-shaped polychannel 112 is composed of extruded polycarbonate plastic, it will be recognized that polychannel 112 may be formed from other materials such as polypropylene plastic. The S-shaped polychannel 112 has a curvature similar to the inside surface of the side channel 102 formed by the corrugations 110 and the chambers 111. Additionally, the S-shaped polychannel 112 is of a tapered profile to mechanically lock the busbars 30 into place. For example, the polychannel 112 may have a minimum wall thickness near the inward-facing opening of each semi-circular chamber 111 and taper gradually to a maximum thickness at the base of each semi-circular chamber 111. In that way, the busbar 30 is increasingly compressed between the corrugations 110 as it enters the semi-circular chamber 111 between the corrugations 110, wedging the busbars 30 in place. Such wedging resists forces that would otherwise cause shifting in the busway.

In addition, because the polychannel 112 is composed of extruded plastic, the thickness may be easily varied from 0.03 inches to 0.10 inches to allow for different busbar insulation methods and thicknesses without modification of the side channels 102. Use of the polychannel 112 in conjunction with the air gap separating the busbars 30 allows for a thinner insulative layer 108, lowering manufacturing costs. The polychannel 112 may be extruded in single, continuous lengths corresponding to the lengths of the side channels 102.

The busbars 30 are preferably spaced apart at a predetermined centerline-to-centerline distance corresponding to the centerline-to-centerline distance of existing high-amp busways, allowing common bus plugs to interconnect high-amp and low-amp busways. In the preferred embodiment of the present invention, the centerline-to-centerline distance is approximately 0.32 inches. The common bus plug compatibility is described in greater detail in U.S. patent application Ser. No. 09/165,695, now U.S. Pat. No. 6,142,807 filed on the same date as the present application entitled "High Current And Low Current Electrical Busway Systems Having Compatible Bus Plug" and incorporated herein in its entirety. The integral corrugations 110 and narrow air gap between the busbars 30 result in a lower "trapped air" thermal insulation increasing thermal conductivity to the environment and allowing increased current ratings. A smaller busway housing 100 cross sectional area results in lower material and manufacturing costs and a smaller footprint for the busway.

The optional double neutral busbar 30dn may be provided where the loads to which the, busbar is providing power have substantially non-linear components. The addition of busbar 30dn insures the neutral busbars 30n, 30dn are capable of carrying the increased currents occurring in neutral busbars 30n, 30dn as a result of additive harmonic currents caused by non-linear loads.

Each side channel 102 includes a top member 114 and a bottom member 116, each disposed in a vertical orientation. In the preferred embodiment, an upper L-shaped extension member 118 connects a horizontal flange 120 to member 114, and a lower L-shaped extension member 122 connects a horizontal flange 124 to member 116. Each flange 120, 124 includes a clamping extension member 120a used for clamping a bus plug to the busway 40. Each flange 120, 124 also includes a ridge 120b used for attaching the busway 40 to a building structure. The flanges 120, 124 and extension members 118, 122 provide a structure by which the busway is supported, and also provide a structure which facilitates the dissipation of heat generated within the busway. Moreover, the shape of the busway housing 100, with the flanges 120, 124, members 114, 116 and extension members 118, 122 is generally I-shaped, providing structural strength in the same manner as a traditional I-beam.

The first and a second side channels 102 may be suitably joined together utilizing a variety of joining mechanisms applied to the corresponding upper abutting members 114 and to the corresponding lower abutting members 116 to create a plurality of fastener joints 126. The abutting members 114, 116 contact along joining surfaces 114a, 116a. In the following discussion, the joining mechanism will be described only for members 114, but the same mechanism will also typically be applied to members 116 also. In the preferred embodiment, the joining mechanism comprises of a plurality of HENROB™ rivets (available from Henrob Corporation located in Farmington Hills, Mich.) pressed into the member 114 of the first side channel 102 and penetrating the member 114 of the second side channel 102, displacing the material of the members 114 such that fastener joints 126 are formed from the rivets and the displaced material of members 114. In an alternative embodiment (not shown), the plurality of fasteners is comprised of a plurality of TOX™ joints (formed using process developed by TOX-Pressotechnik L.L.C., located in Warrenville, Ill.) created via material of the member 114 of the first side channel 102 being pressed and penetrating the material of the member 114 of the second side channel 102, such that a bond is formed from the displaced material of members 114. In another alternative embodiment (not shown), a bolt is inserted through aligning holes in members 114 and tightened via a nut. It will be recognized that such connection methods may be used in combination or that other known connection methods may be suitably employed.

Joining the two side channels 102 together along a seam perpendicular to the orientation of the busbars 30 also provides additional structural benefits. When a short circuit occurs, for example, during short circuit testing, the large amount of current present in busbars 30 tends to force the busbars 30 apart. Since this "blow-apart" force operates in the same plane as the seam, it is resisted by the side channels 102 and does not directly stress fastener joints 126, resulting in a very strong construction.

The side channels 102 include an upper and lower pair of grooves 128 which allow for the sealing of the busway housing 100 via the use of a gasket 130 or sealing compound (not shown). The gasket 130 allows use of the present invention in environments exposed to moisture such as areas covered by a sprinkler system. Busway 40 is 5.50 inches in width, the horizontal direction as shown in FIG. 2, and 5.00 inches in height, the vertical direction as shown in FIG. 2.

Figure 3:
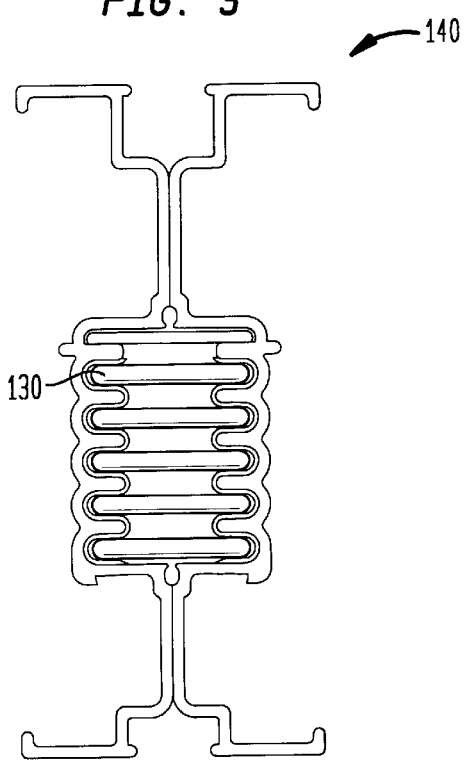
FIG. 3 is an end view of an alternative embodiment of a busway illustrating a plurality of busbars contained within a two-piece housing in accordance with the present invention.

FIG. 3 is a transverse cross-sectional view of an alternative embodiment of a busway 140 in accordance with the present invention. Busway 140 differs from busway 40 in that the width of busway 140 is 2.00 inches, as opposed to 5.50 inches for busway 40. Additionally, busbars 130 are 0.75 inches in width, as opposed to 4.25 inches for busbars 30. In all other respects, busway 140 conforms to the description of busway 40 given above. Other alternative embodiments include a variety of busway and busbar widths and the present invention should not be construed as limited to the two embodiments given. A series of busway housing and busbar widths corresponding to a series of maximum amperage ratings can be manufactured in order to provide varying current capacity requirements, as illustrated in FIGS. 5A and 5B and described further below.

Figure 4A:
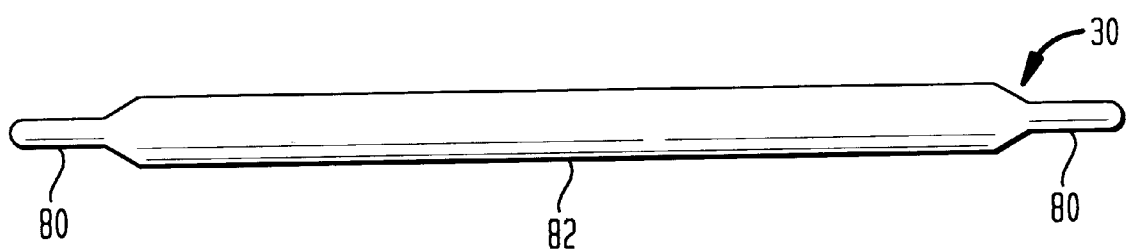
FIG. 4A is an end view of a busbar in accordance with the present invention.
Figure 4B:
FIG. 4B is an end view of an alternative embodiment of a busbar in accordance with the present invention.

FIG. 4A shows an end view of busbar 30 in accordance with the present invention. FIG. 4B shows an end view of an alternative embodiment of busbar 130 in accordance with the present invention. As described above, busbars 30, 130 can be composed of copper, aluminum or other conductive material or materials. Busbar 30 includes two rounded edge sections 80 of a first thickness and a center section 82 of a second, larger thickness. The edge sections 80 are continuous, running the full length of the busbars. Busbar 30 has a width of 4.25 inches, a thickness of about 0.094 inches at edge sections 80 and a thickness of 0.125 inches at center section 82. The thickness of about 0.094 inches at the edge sections 80 allows the busbars 30 to fit within the corrugations 110 and allows bus plugs to attach directly to low-amp busbars 30 as well as to the pressed tabs of one set of preexisting compatible high-amp busways, which are also is of about 0.094 inch thickness. Thus, the thickness of section 82 can be increased or decreased to allow higher or lower current capacity busbars to be produced without requiring modifications to common bus plugs or to the corrugations 110, allowing the same busway housing to be used for multiple current ratings. In other words, the shape of the side channels 102, including the corrugations 110, need not be changed for varying thicknesses of section 82. As shown in FIG. 4B, an alternative embodiment of busbar 130 for use in busway 140, is of a uniform thickness of 0.094 inches and 0.75 inches in width.

FIG. 5A shows a Table 300A which lists the busway widths, busbar widths, busbar thicknesses and maximum current capacity for copper composition busbars for alternative embodiments of busway 40 in accordance with the present invention. FIG. 5B shows a Table 300B which lists the busway widths, busbar widths, busbar thicknesses and maximum current capacity for aluminum composition busbars for alternative embodiments of busway 40 in accordance with the present invention. One skilled in the art would appreciate that the present invention can be applied to a variety of busway widths, busbar widths and busbar thickness and should not be construed as limited to the embodiments shown and described herein. All components of the busway, except for the side channels and the busbars, are common to each alternative embodiment. Only five side channel profiles are necessary for the entire amperage range, minimizing manufacturing inventory.

Figure 6:
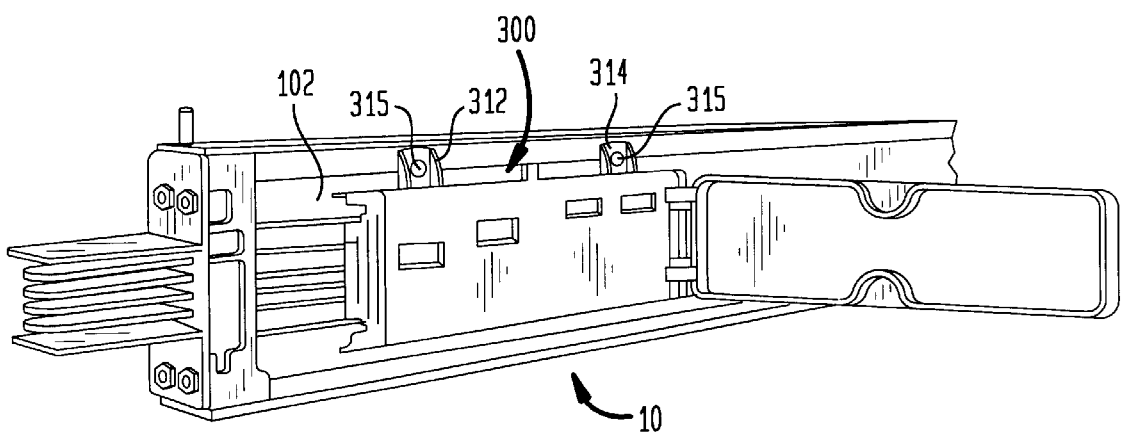
FIG. 6 is a perspective view of a busway system and a door assembly in accordance with the present invention.

In the electrical power distribution busway system 10 (shown in FIG. 1), it is necessary to provide power tap-off locations which allow access to the conductive busbars for connecting machines, light systems and other devices requiring electrical power. Referring to FIG. 6, a perspective view of a busway 10 and door assembly 300 for providing access to the busbars 30 is shown. The door assembly 300 is provided to permit connection to a bus plug having fingers for engaging the busbars. The door assembly 300 is positioned to provide access to housing openings 220, 222, 224, 226 in the side channels 102.

Figure 7A:
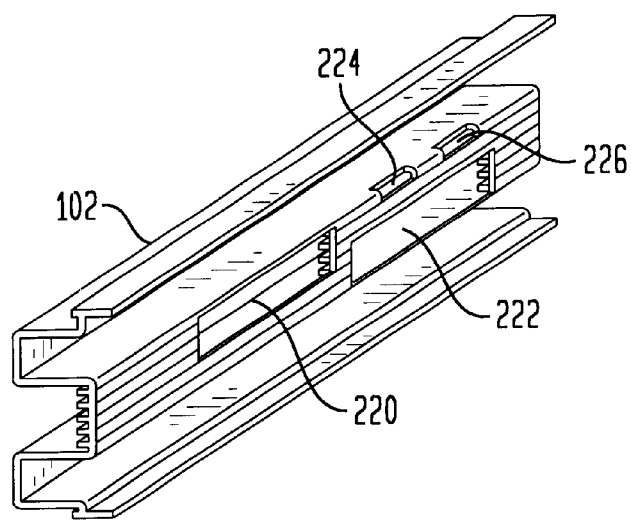
FIG. 7A is a perspective view of a side channel in accordance with the present invention.
Figure 7B:
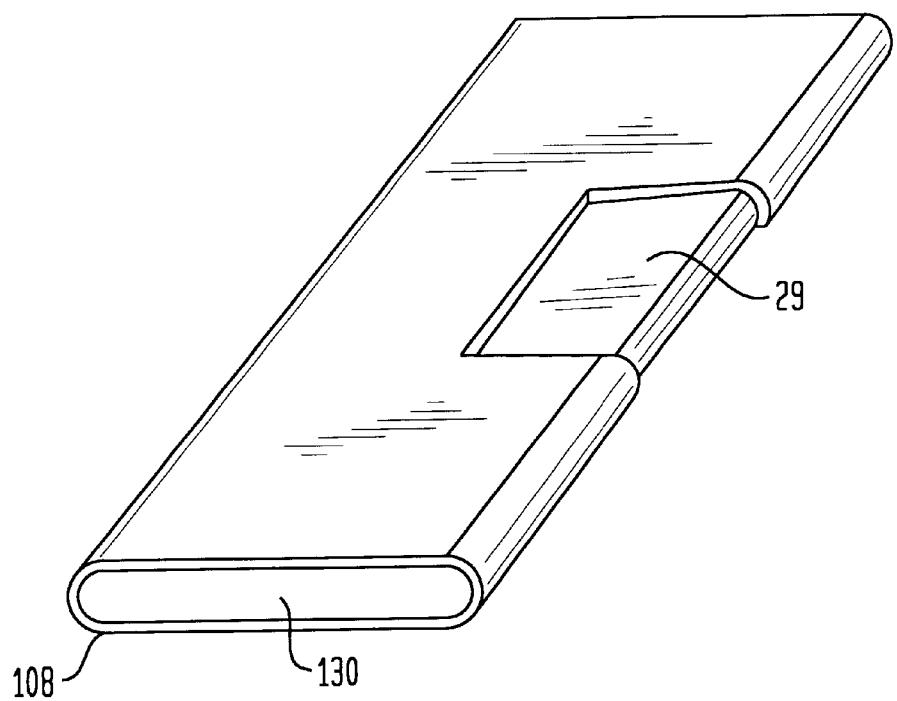
FIG. 7B is a perspective view of an alternative embodiment of a busbar in accordance with the present invention.
Figure 8:
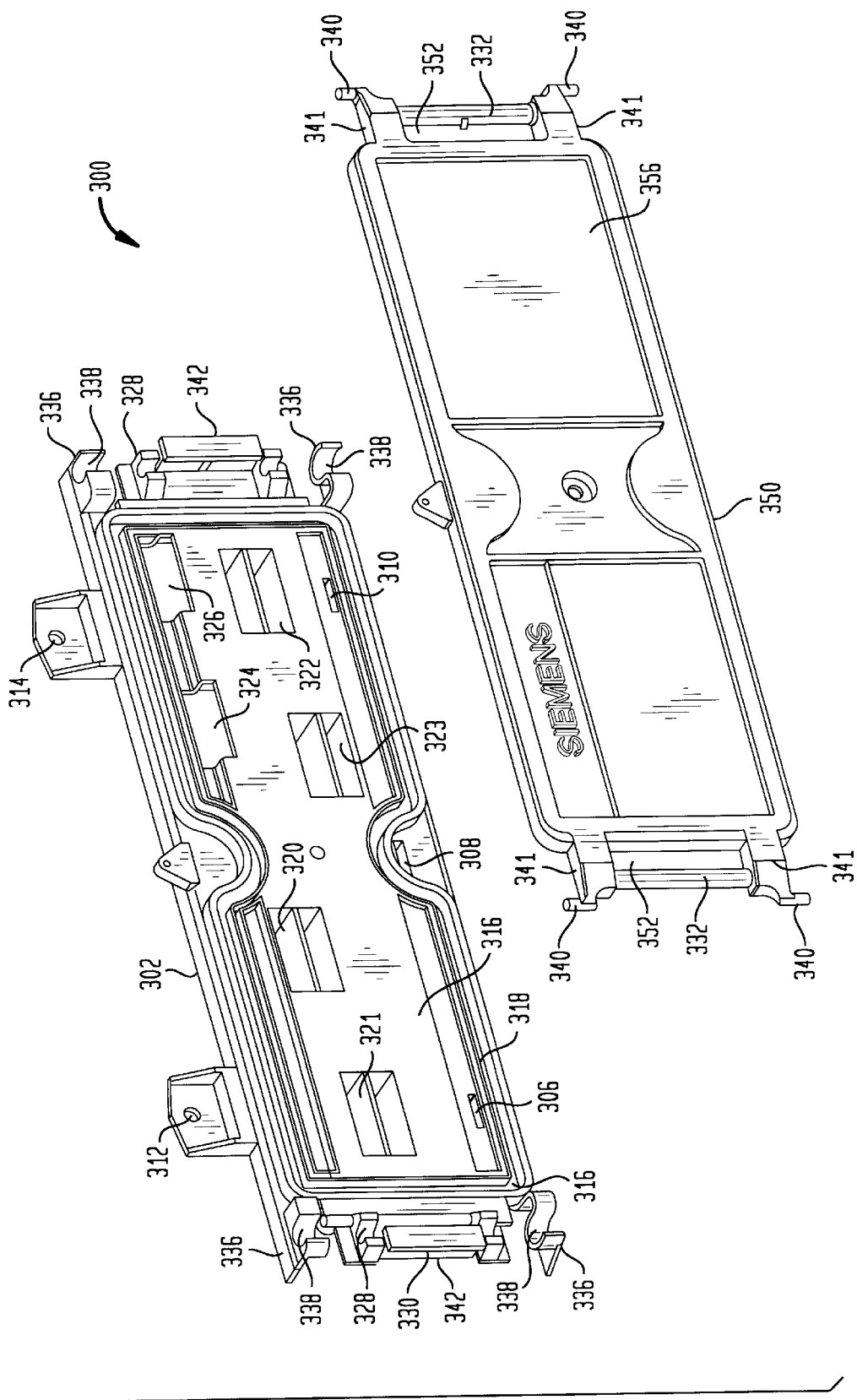
FIG. 8 is an exploded perspective view of the door assembly of FIG. 6.

FIG. 8 shows a perspective view of the door assembly 300 in accordance with the present invention. The door assembly 300 is of generally rectangular shape and includes an insulator plate 302 and a door 304. Access to the busbars 30 is accomplished by exposing the busbars 30 through the elongated slots 220, 222, 224, 226 in the side channel 102 and a plurality of corresponding openings 320, 321, 322, 323, 324, 326 in the insulator plate 302. To facilitate connection with the busplug (not shown), each of the busbars 30 include a plug-in pad 29 (shown in FIG. 7B) where the busbars 30 have been partially stripped of the insulative layer 108 in the area adjacent to and corresponding with the slots 220, 222, 224, 226. The plug-in pad 29 is shown in FIG. 7B for the busbar 130, but the plug-in pads 29 are formed on busbar 30 also. The door assembly 300 is designed to limit access to the busbars 30 for reasons of safety and also to provide insulation between busbars 30, thereby reducing the risk of arcing between the busbars 30.

Figure 10:
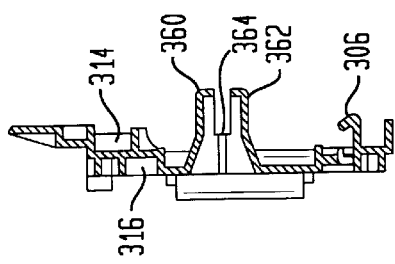
FIG. 10 is a section on the line 10—10 of FIG. 9.
Figure 9:
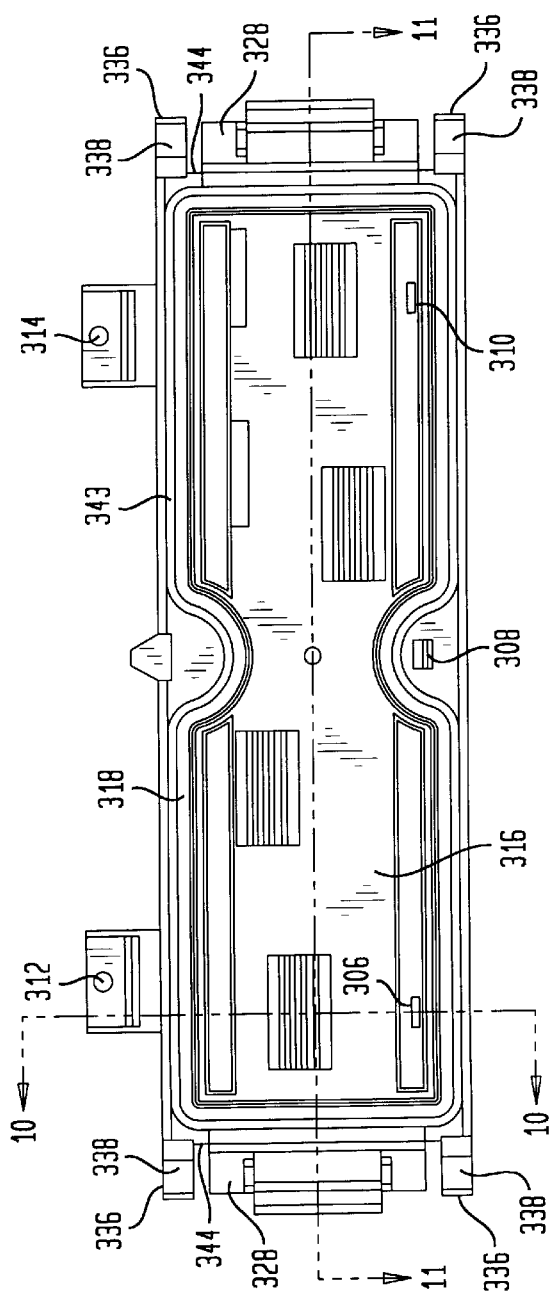
FIG. 9 is a frontal view of an insulator plate in accordance with the present invention.

As shown in FIGS. 8–10, the insulator plate 302 includes an inside surface 314 disposed towards the side channel 102 and an outside surface 316 disposed opposite the inside surface 314. Insulator plate 302 includes two generally parallel narrow sides 344. The insulator plate 302 is mounted on the side channel 102 via three flanges 306, 308, 310 which secure insulator plate 302 by snapping into engagement with the side channel 102. Insulator plate 302 is further secured to side channel 102 by a pair of screws 315 (shown in FIG. 6) inserted through a pair of holes 312, 314.

The plurality of slots 320, 321, 322, 323, 324, 326 extend through the thickness of insulator plate 302 generally perpendicular to inside surface 314 and outside surface 316. Each slot 320, 321, 322, 323, 324, 326 is disposed so that it will be in proximity to at least one of the busbars 30 when door assembly 300 is installed in side channel 102 in alignment with side channel openings 220, 222, 224, 226. Additionally, the slots 320, 321, 322, 323, 324, 326 are disposed in staggered manner to increase the separation distance between the pads 29, reducing the risk of arcing. As best seen in FIG. 10, each slot 320, 321, 322, 323 includes an upper insulator stab 360 and a lower insulator stab 362 which enclose the busbars 30 and further reduce the risk of arcing. A center member 364, disposed in the center of each slot in the same plane as the busbar 30, prevents inadvertent contact with the pads 29 when the door 304 is open and guides the fingers into each slot.

Slot 320 provides access to busbar 30a (A-phase) and is aligned with the slot 220 in the side channel 102. Slot 321 provides access to busbar 30b (B-phase) and is also aligned with the slot 220. Slot 322 provides access to busbar 30c (C-phase) and is aligned with the slot 222 in the side channel 102. Slot 323 provides access to busbar 30n (neutral) and is also aligned with the slot 222. Slot 324 provides access to busbar 30g (ground) when busbar 30g is used as isolated (insulated) ground and is aligned with the slot 224. Slot 326 provides access to busbar 30g (ground) and is aligned with the slot 226.

The outside surface 316 of the insulator plate 302 includes a channel structure 318 which contains a sealing gasket 343. As seen in FIG. 9, a corresponding ridged structure 358 is disposed on the inner surface of the door 304 such that when the door 304 is closed, the ridged structure engages the sealing gasket 343 of channel structure 318, forming a moisture proof seal.

Figure 11:
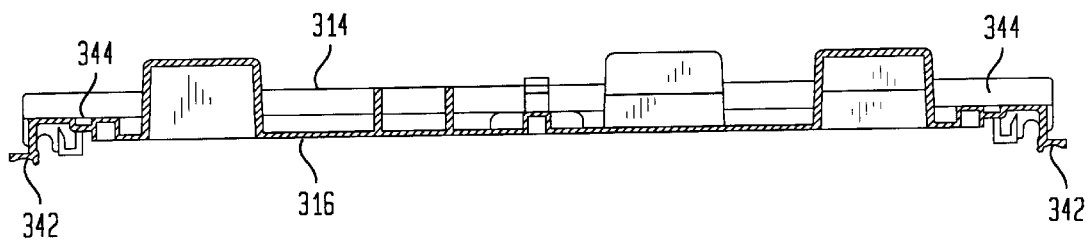
FIG. 11 is a section on the line 11—11 of FIG. 9.

A hinge groove 328 is disposed on each of the narrow sides 344 of the insulator plate 302. As best seen in FIGS. 8 and 11, a shaped tab 342 is disposed on each of the narrow sides 344 of the insulator plate 302. A pair of saddle members 336 are disposed on each of the narrow sides 344 of the insulator plate 302 and each saddle member 336 includes a partial cylinder 338, shown in FIG. 8, having an outer cylindrical surface concentric with an axis of the hinge grooves 328.

Figure 12:
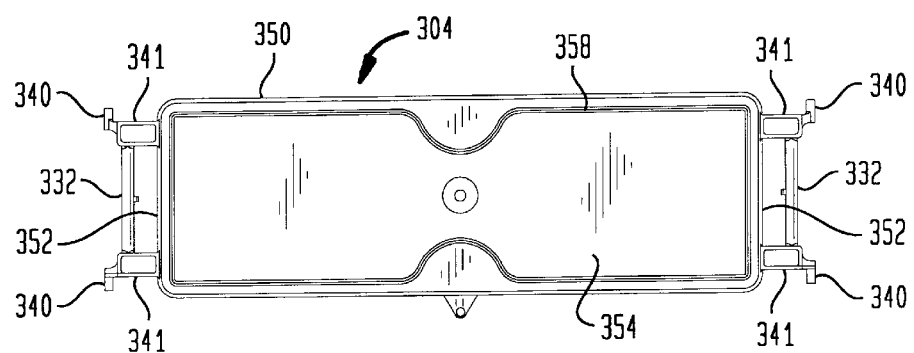
FIG. 12 is a rear view of a door in accordance with the present invention.
Figure 13:
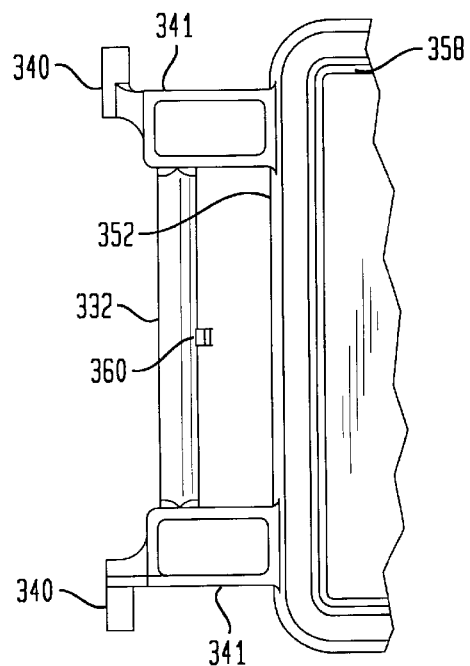
FIG. 13 is a detail view of the hinge portion of the door of FIG. 12.

As seen in FIGS. 12 and 13, the door 304 includes a generally rectangular planar member 350 with a first and a second narrow side 352, an inner surface 354 and an outer surface 356 (shown in FIG. 8). A pair of extension members 341 are disposed on each of two narrow sides 344 of the door 304 in a plane generally perpendicular to the narrow sides 352. A first hinge rod 332 is disposed between the extension members 341 of the first narrow side 352. A second hinge rod 332 is disposed between the extension members 341 of the second narrow side 352.

A cylindrical ear 340 is disposed on each of the extension members 341 and is oriented parallel to the narrow sides 352. The door 304 is mounted on the door assembly by hinge rods 332 snapping into hinge grooves 328 with the shaped tabs 342 holding hinge rods 332 in place.

Once mounted, the door 304 is opened in a first direction by unsnapping the first hinge rod 332, allowing the door 304 to rotate about the second hinge rod 332 in the hinge groove 328. Alternatively, the door 304 is opened in a second direction by unsnapping the second hinge rod 332, allowing the door to rotate about the first hinge rod 332 in the hinge groove 328. In other words, the door 304 advantageously functions as a dual hinged door and can be opened in either of two directions, allowing improved access to busbars 30.

Optionally, each shaped tab 342 includes a notch 330 and each hinge rod 332 includes a shaped flange 360. Once opened, the shaped flange 360 enters the slot 330. Friction of the shape flange 360 in the slot 330 holds the door 304 in the open position, preventing wind or other disturbances from causing the door 304 to vibrate or to snap closed.

Additionally, when the door 304 opens about either hinge rod 332, the ears 340 rotate about the hinge groove 328, moving behind the outer surface of the partial cylinders 338 of saddle members 336. With the door 304 in either open position, partial cylinders 338 prevent the door from being removed by engaging ears 340, thus preventing the hinge rod 332 from being removed from hinge groove 328. This prevents door 304 from being removed after the installation of the bus plug.

It should be recognized that the present invention may be embodied in various forms and should not be construed as limited to the embodiments set forth above. For example, it should be recognized that the hinge rods and ears may be attached to the insulator plate and the hinge grooves and saddle members may be attached to the door. Additionally, a further embodiment would include a single ear and a single saddle on each edge, rather than a pair.

We claim:

1. An electrical busway comprising:

an elongate busway housing;

a door assembly, the door assembly including:
   an insulator plate attached to the housing, the insulator plate including a first insulator plate edge, a second insulator plate edge opposite the first insulator plate edge, a first hinge groove disposed on the first insulator plate edge and a second hinge groove disposed on the second insulator plate edge;
   a door having a closed position, a first open position and a second open position, the door including a first door edge, a second door edge opposite the first door edge, a
   first hinge rod disposed on the first door edge and a second hinge rod disposed on the second door edge;
   whereby when the first hinge rod is disposed within the first hinge groove and the second hinge rod is disposed within the second hinge groove, the door is in the closed position;
   whereby when the first hinge rod is pivotally disposed within the first hinge groove and the second hinge rod is disposed outside the second hinge groove, the door is in the first open position;
   whereby when the second hinge rod is pivotally disposed with the second hinge groove and the first hinge rod is disposed outside the first hinge groove, the door is in the second open position;
   said door assembly further including a pair of shaped tabs, the first shaped tab disposed on the first insulator plate edge, the second shaped tab disposed on the second insulator plate edge, the shaped tabs adapted to allow the hinge rods to snap into the hinge grooves and to maintain the hinge rods within the hinge grooves;
   a shaped flange disposed on the surface of the first hinge rod;
   a notch disposed in the first shaped tab;
   whereby when the door is rotated to the first open position the shaped tab can be flexed to allow the shaped flange to enter the notch and hold the door in the first open position; and
   whereby when shaped flange is disposed within the notch and the door is in the first open position, the shaped tab can be flexed to allow the shaped flange to leave the notch such that the door can be moved to the closed position.

* * * * *